(12) United States Patent
Park

(10) Patent No.: US 7,714,614 B2
(45) Date of Patent: May 11, 2010

(54) SERIAL DATA RECEIVING APPARATUS AND ELECTRONIC APPARATUS USING SAME

(75) Inventor: Jeong-kee Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/013,551

(22) Filed: Jan. 14, 2008

(65) Prior Publication Data

US 2009/0027564 A1  Jan. 29, 2009

(30) Foreign Application Priority Data

Jul. 25, 2007  (KR)  ............... 10-2007-0074703

(51) Int. Cl.
*H03K 19/0175* (2006.01)

(52) U.S. Cl. ............... 326/77; 326/68; 326/73; 326/66

(58) Field of Classification Search ............... None
See application file for complete search history.

(56) References Cited

U.S. PATENT DOCUMENTS

| | | | | |
|---|---|---|---|---|
| 4,417,320 A * | 11/1983 | Ei | ............... | 703/25 |
| 5,128,962 A * | 7/1992 | Kerslake et al. | ............... | 375/220 |
| 5,402,015 A * | 3/1995 | Hammermann | ............... | 326/75 |
| 5,706,357 A * | 1/1998 | Yang | ............... | 381/107 |
| 6,738,855 B1 | 5/2004 | Goldman | | |
| 6,816,201 B1 * | 11/2004 | Fang et al. | ............... | 348/468 |
| 7,093,054 B1 | 8/2006 | Goldman | | |
| 2006/0006907 A1 * | 1/2006 | Hsieh | ............... | 326/70 |

\* cited by examiner

*Primary Examiner*—Anh Q Tran
(74) *Attorney, Agent, or Firm*—Sughrue Mion, PLLC

(57) ABSTRACT

A serial data receiving apparatus includes a transistor, a resistor, and a diode, converts input data of an RS232 standard to data of a TTL/CMOS standard.

13 Claims, 5 Drawing Sheets

SERIAL DATA RECEIVING APPARATUS AND ELECTRONIC APPARATUS USING SAME

CROSS-REFERENCE TO RELATED APPLICATIONS

This application claims priority under 35 U.S.C. §119 from Korean Patent Application No. 10-2007-0074703, filed on Jul. 25, 2007, in the Korean Intellectual Property Office, the disclosure of which is incorporated herein by reference in its entirety.

BACKGROUND OF THE INVENTION

1. Field of the Invention

Apparatuses consistent with the present invention relate to a serial data receiving apparatus and an electronic apparatus using the same, and more particularly, to a serial data receiving apparatus which receives serial data transmitted from an external device such as a computer, instead of an RS232 integrated circuit (IC).

2. Description of the Related Art

In general, Recommended Standard Number 232 (RS232) interface standards are standards which are used for serial data communications between a computer and its peripherals. Electronic apparatuses such as televisions use an integrated circuit (IC) compatible with RS232 standards in order to upgrade programs or provide after-sales service.

Electronic apparatuses generally have a 9-pin D-SUB connector, through which the electronic apparatus can perform RS232 interfacing with a computer. That is, the electronic apparatus is connected to the computer using a 9-pin D-SUB connector, and an RS232 IC receives serial data transmitted from the computer, and transmits the data to a modem multiplexer (micom) which controls the operation of the electronic apparatus. The operation of receiving serial data of the RS232 IC is briefly described with reference to FIG. 1.

FIG. 1 is a schematic block diagram illustrating a related art serial data receiving apparatus.

In FIG. 1, the RS232 IC functions as an RS232 receiver which receives serial data, and the RS232 receiver 10 includes a level change unit 12, and an inversion unit 14.

The level change unit 12 receives RS232 data, and changes its voltage level to Transistor-Transistor Logic/Complementary Metal-Oxide Semiconductor (TTL/CMOS) voltage level. In other words, the RS232 data are received with a high voltage level of +3 V to +15 V, and with a low voltage level of −15 V to −3 V. The level change unit 12 changes such a voltage level to TTL/CMOS voltage level having +2 V to +5 V and +0.8 V to 0 V.

The inversion unit 14 inverts the data changed to TTL/CMOS voltage level. In more detail, the inversion unit 14 inverts the high voltage level of +2 V to +5 V to the low voltage level of 0 V to 0.8 V, and inverts the low voltage level of +0.8 V to 0 V to the high voltage level of +2 V to +5 V, so that the input data are inverted and output to TTL/CMOS data.

Such an RS232 receiver 10 converts RS232 data into TTL/CMOS data, and transmits the TTL/CMOS data to a micom (not shown). Such functions are performed by an IC which is more expensive than basic elements such as a transistor, a resistor, and a diode, resulting in increased manufacture costs.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

A serial data receiving apparatus using a transistor, a resistor, and a diode, and an electronic apparatus using the same are provided.

According to an aspect of the present invention, there is provided a serial data receiving apparatus including a voltage supply unit which supplies voltage, and a conversion unit which converts input data of a first interface standard into data of a second interface standard by changing the voltage level of the input data of the first interface standard and inverting the input data using the voltage supplied from the voltage supply unit.

The conversion unit may be at least one of an N-type transistor which operates if the input data have a high voltage level, and a P-type transistor which operates if the input data have a low voltage level.

The at least one P-type transistor may be at least one of a PNP Bipolar Junction Transistor (BJT), a p-channel Metal-Oxide Semiconductor Field Effect Transistor (MOSFET), and a p-channel Junction Field Effect Transistor (JFET). The at least one N-type transistor may be at least one of an NPN BJT, an n-channel MOSFET, and an n-channel JFET.

The serial data receiving apparatus further includes a protection unit which protects the conversion unit from external electrical disturbances.

The input data of the first interface standard are data of a Recommended Standard number 232 interface standard, and the data of the second interface standard are data having voltage levels compatible with TTL/CMOS voltage levels.

The conversion unit comprises a transistor which operates if the input data have a high voltage level, and does not operate if the input data have a low voltage level, a first resistor connected between a base of the transistor and an input terminal where the data are input, and a second resistor connected between a collector of the transistor and the voltage supply unit, wherein the input data are output through a node connected to the collector and the second resistor.

The serial data receiving apparatus further includes a diode having a first terminal connected to the base of the transistor, and a second terminal connected to a ground. The diode protects the conversion unit from external electrical disturbances.

Another aspect of the invention provides a conversion unit comprising a transistor which operates if the input data have a low voltage level, and does not operate if the input data have a high voltage level, a first resistor which is connected between a base of the transistor and an input terminal where the data are input, and a second resistor which is connected between an emitter of the transistor and a ground, wherein the input data are output through a node which is connected to the emitter and the ground.

The serial data receiving apparatus further includes a diode having a second terminal connected to the base of the transistor, and a first terminal connected to the ground. The diode protects the conversion unit from external electrical disturbances.

According to another aspect of the present invention, there is provided an electronic apparatus including an connection unit connected to an external device, and a data receiving unit which performs voltage level change and logic inversion of input data of a first interface standard, which are transmitted from the external device, and outputs data of a second interface standard.

The input data of the first standard are data of Recommended Standard number 232 interface standard, and the data of the second interface standard are data having voltage levels compatible with Transistor-Transistor Logic/Complementary Metal-Oxide Semiconductor (TTL/CMOS) voltage levels.

The electronic apparatus further includes a tuner unit which receives and tunes a broadcast signal from a broadcasting station.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
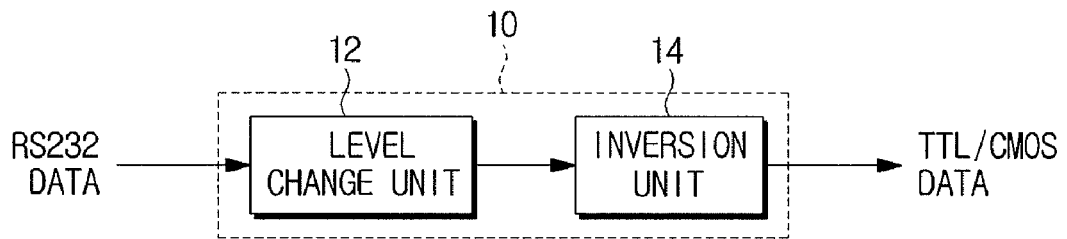
FIG. 1 is a schematic block diagram illustrating a related art serial data receiving apparatus.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 2:
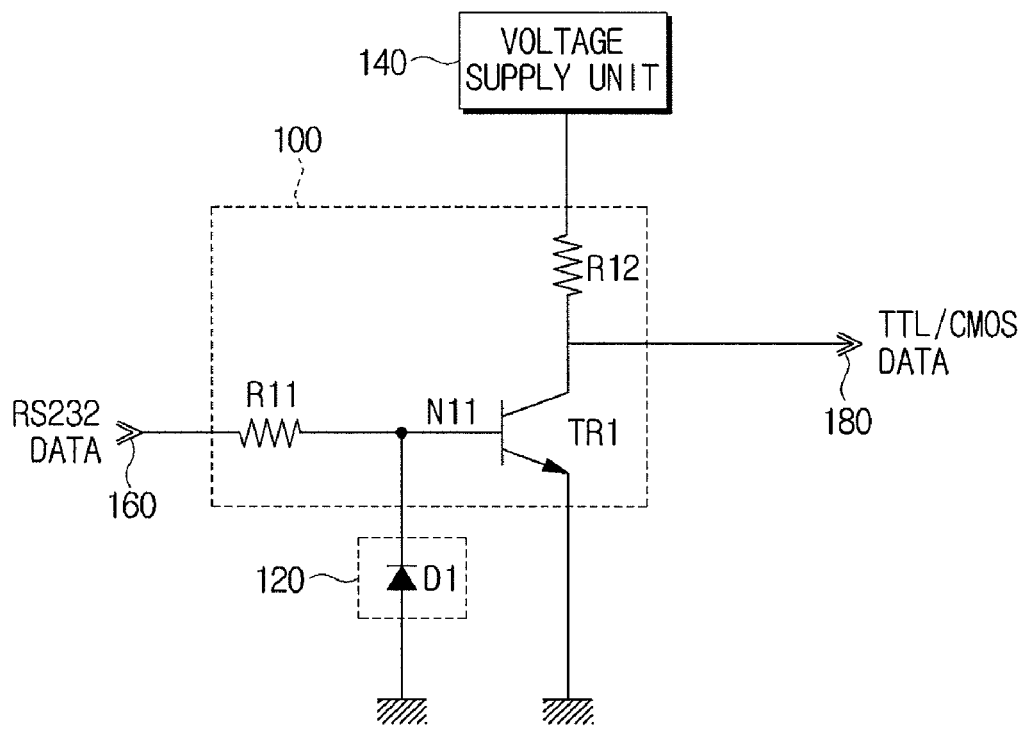
FIG. 2 is a circuit diagram illustrating the structure of the circuit of a serial data receiving apparatus according to an exemplary embodiment of the present invention.

FIG. 2 is a circuit diagram illustrating the structure of the circuit of a serial data receiving apparatus according to an exemplary embodiment of the present invention.

With reference to FIG. 2, the serial data receiving apparatus 100 includes a conversion unit 100, a protection unit 120, and a voltage supply unit 140.

The voltage supply unit 140 supplies voltage of +2 V to +5 V to the conversion unit 100.

The conversion unit 100 converts RS232 data input through an input terminal 160 into data having voltage levels compatible with TTL/CMOS data, and outputs the TTL/CMOS data to an output terminal 180. The conversion unit 100 includes a transistor TR1, a first resistor R11 which is connected between a base of the transistor TR1 and the input terminal 160, and a second resistor R12 which is connected between a collector of the transistor TR1 and the voltage supply unit 140.

If the RS232 data input through the input terminal 160 have a high voltage level of +3 V to +15 V, the transistor TR1 is turned on, and TTL/CMOS data having a low voltage level of +0 V to +0.8 V are output.

If the RS232 data input through the input terminal 160 have a low voltage level of −15 V to −3 V, the transistor TR1 is turned off, and TTL/CMOS data having a high voltage level of +2 V to +5 V are output through the output terminal 180.

The transistor TR1 is at least one an NPN BJT, an N-channel MOSFET, and an N-channel JFET.

The protection unit 120 protects the conversion unit 100 from external electrical disturbances, and consists of a diode D1. A cathode of the diode D1 is connected to the base of the transistor TR1, and in and out of the diode D1 is connected to a ground. When RS232 data of −15 V to −3 V are input through the input terminal 160, the protection unit 120 is operated to protect the conversion unit 100 from external electrical disturbances.

When RS232 data of +3 V to +15 V are input through the input terminal 160, the base-emitter of the transistor TR1 can function as the protection unit 120. The node N11 maintains a voltage of −0.7 V to +0.7 V regardless of the voltage level of the input data using the diode D1 and the base-emitter of the transistor TR1.

In other words, if the RS232 data have a high level of +3 V to +15 V, the voltage +0.7 V is generated at node N11, and the transistor TR1 is thus turned on. If the RS232 data have a low level of −15 V to −3 V, the voltage −0.7 V is generated at node N11, and the transistor TR1 is thus turned off.

Figure 3:
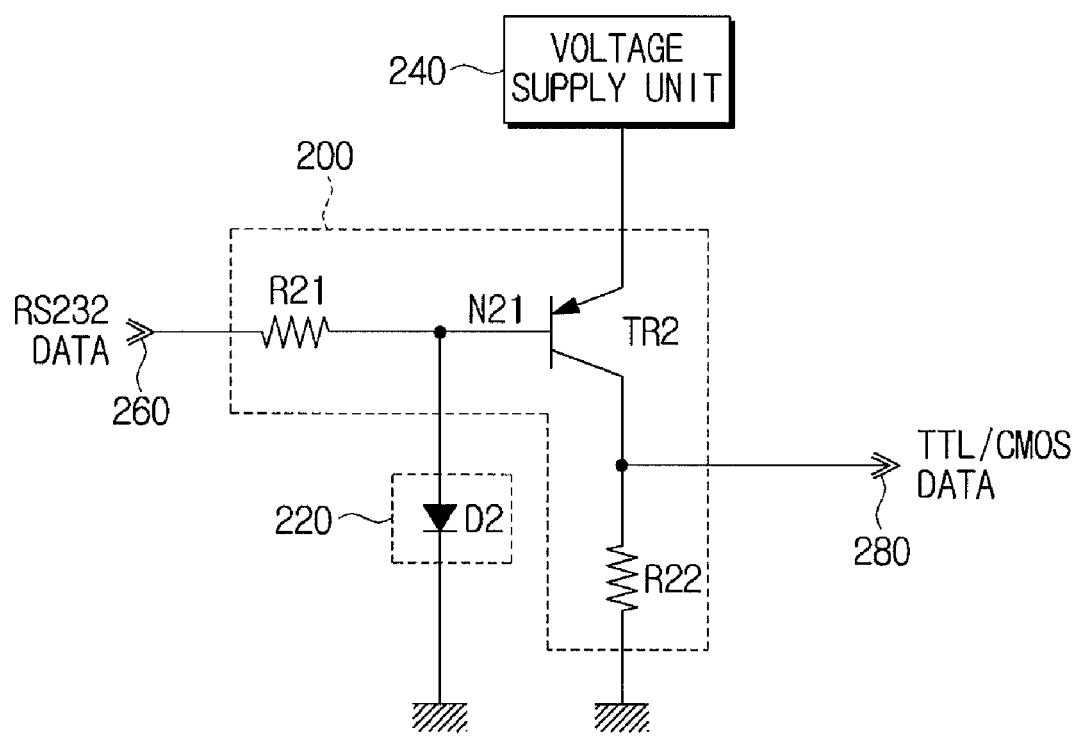
FIG. 3 is a circuit diagram illustrating the structure of the circuit of a serial data receiving apparatus according to another exemplary embodiment of the present invention.

FIG. 3 is a circuit diagram illustrating the structure of the circuit of a serial data receiving apparatus according to another exemplary embodiment of the present invention.

With reference to FIG. 3, the serial data receiving apparatus includes a conversion unit 200, a protection unit 220, and a voltage supply unit 240.

The voltage supply unit 240 supplies voltage of +2 V to +5 V to the conversion unit 200.

The conversion unit 200 converts RS232 data input through an input terminal 260 into data having voltage levels compatible with TTL/CMOS data, and outputs the TTL/CMOS data to an output terminal 280. The conversion unit 200 includes a transistor TR2, a first resistor R21 connected between a base of the transistor TR2 and the input terminal 260, and a second resistor R22 connected between a collector of the transistor TR2 and a ground.

If the RS232 data input through the input terminal 260 have a high voltage level of +3 V to +15 V, the transistor TR2 is turned off, and TTL/CMOS data having a low voltage level of +0 V to +0.8 V are output through the output terminal 280.

If the RS232 data input through the input terminal 260 have a low voltage level of −15 V to −3 V, the transistor TR2 is turned on, and TTL/CMOS data having a high voltage level of +2 V to +5 V are output.

The transistor TR2 is at least one of a PNP BJT, a P-channel MOSFET, and a P-channel JFET.

The protection unit 220 protects the conversion unit 200 from external electrical disturbances, and consists of a diode D2. An anode of the diode D2 is connected to the base of the transistor TR2, and a cathode of the diode D2 is connected to a ground. When RS232 data of +3 V to +15 V are input through the input terminal 260, the protection unit 220 is operated to protect the transistor TR2.

When RS232 data of −15 V to −3 V are input through the input end 260, the base-collector of the transistor TR2 can function as the protection unit 220. The node N12 maintains a voltage of −0.7 V to +0.7 V regardless of the voltage level of the input data using the diode D2 and the base-collector of the transistor TR2.

In other words, if the RS232 data have a high voltage level of +3 V to +15 V, the voltage +0.7 V is generated at node N12, and the transistor TR2 is thus turned off. If the RS232 data have a low voltage level of −15 V to −3 V, the voltage −0.7V is generated at node N12, and the transistor TR2 is thus turned on.

Figure 4A:
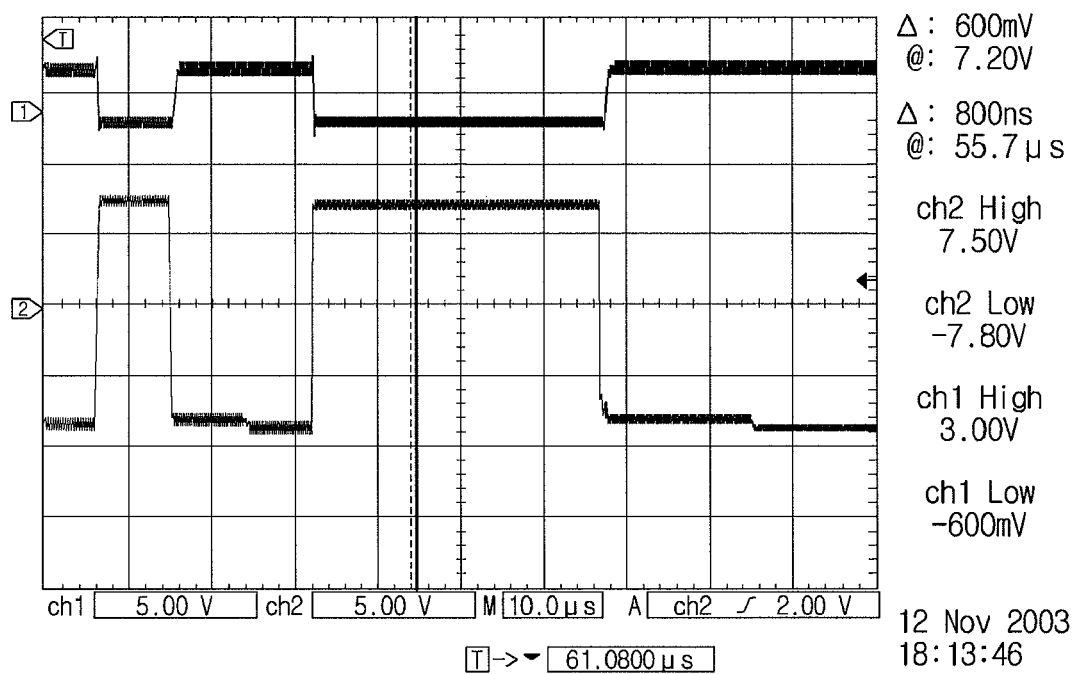
FIGS. 4A and 4B are waveforms comparing the performance of a serial data receiving apparatus according to exemplary embodiments of the present invention with that of a related art serial data receiving apparatus.
Figure 4B:
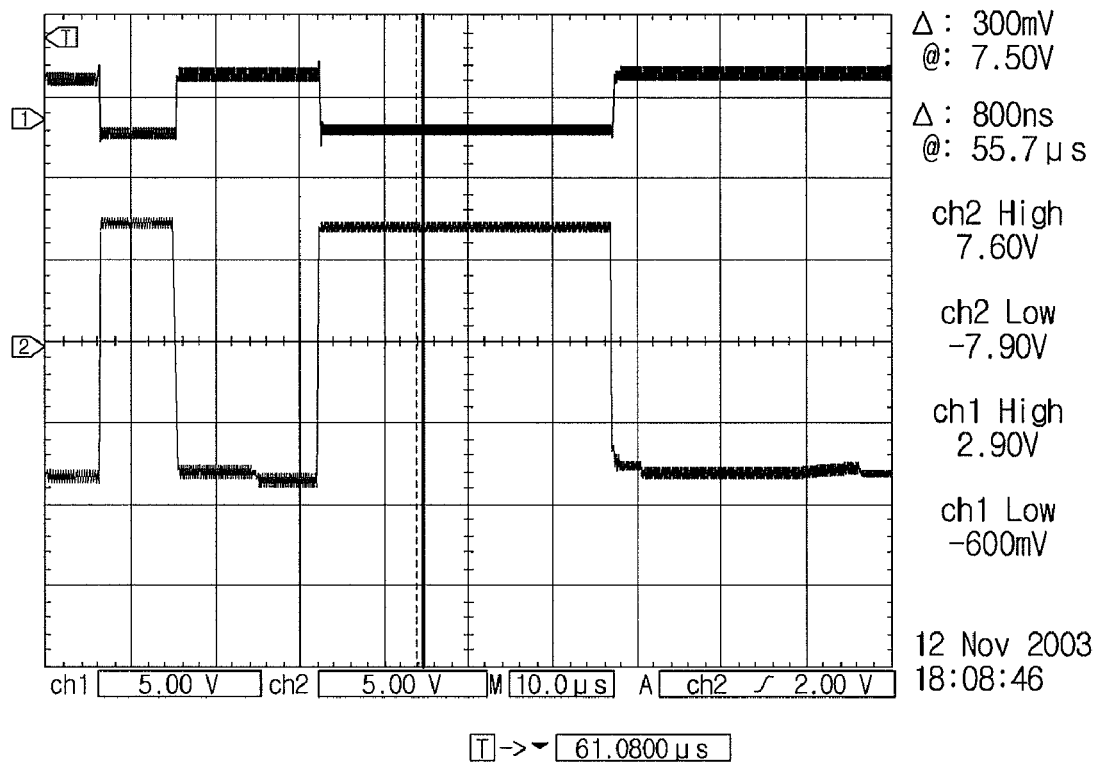

FIGS. 4A and 4B are waveforms comparing performance of a serial data receiving apparatus according to an exemplary embodiment of the present invention with that of a related art serial data receiving apparatus.

In FIG. 4A, TTL/CMOS data output from a serial data receiving apparatus according to an exemplary embodiment of the present invention are shown in the Ch1 waveform, and RS232 data input to the serial data receiving apparatus are shown in the Ch2 waveform.

In FIG. 4B, TTL/CMOS data output from a related art RS232 receiver are shown in the Ch1 waveform, and RS232 data input to the related art RS232 receiver are shown in the Ch2 waveform.

Comparing the waveforms of FIGS. 4A and 4B, the serial data receiving apparatus according to the exemplary embodiment of the present invention can perform equally as well as the RS232 receiver.

Figure 5:
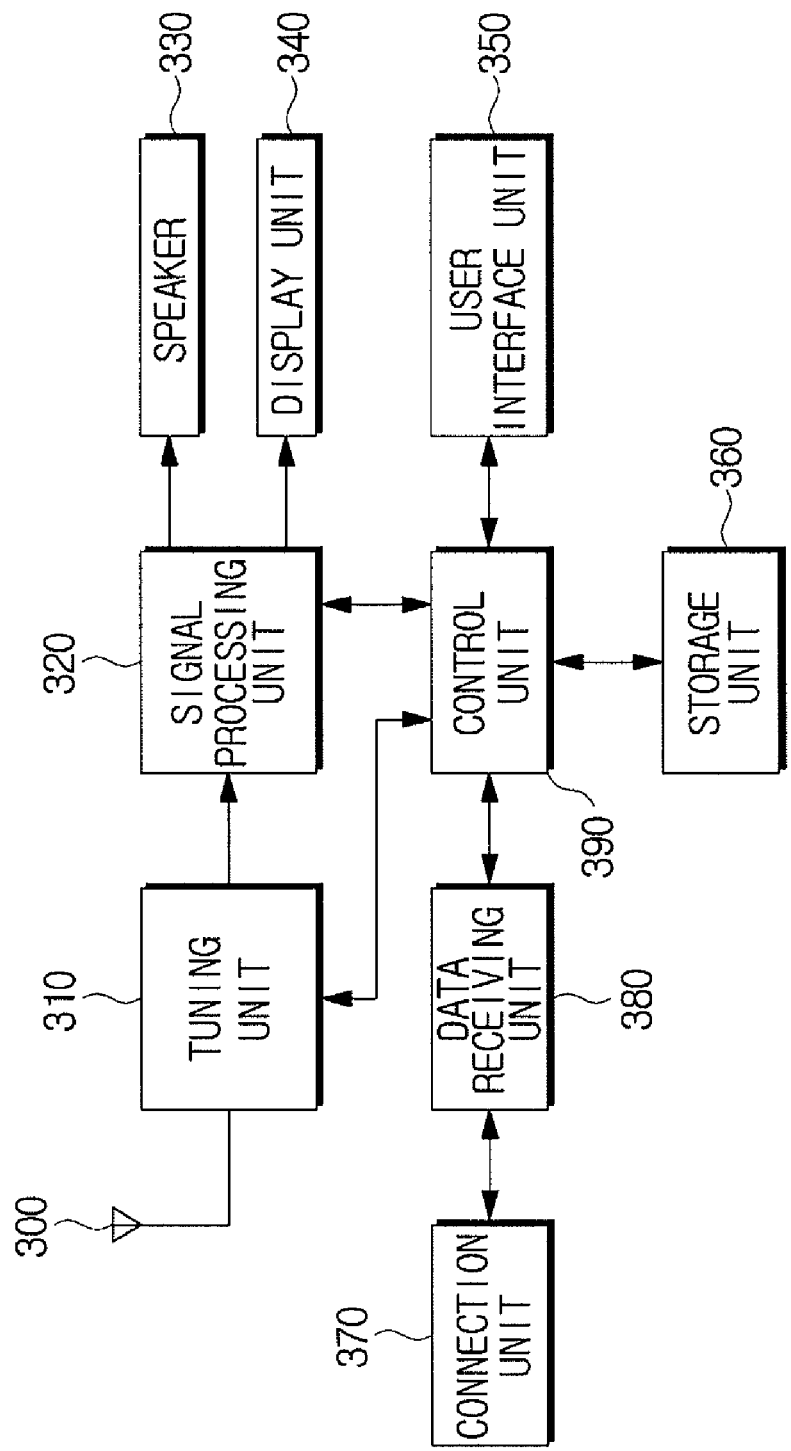
FIG. 5 is a schematic block diagram illustrating the structure of an electronic apparatus using a serial data receiving apparatus according to an exemplary embodiment of the present invention.

FIG. 5 is a schematic block diagram illustrating the structure of an electronic apparatus using a serial data receiving apparatus according to an exemplary embodiment of the present invention.

In FIG. 5, the electronic apparatus is a broadcast receiving apparatus, including a tuning unit 310, a signal processing unit 320, a speaker 330, a display unit 340, a user interface unit 350, a storage unit 360, a connection unit 370, a data receiving unit 380, and a control unit 390.

The tuning unit 310 includes a tuner which tunes to a broadcast signal received via an antenna 300, and a demodulator which demodulates the tuned broadcast signal, corrects errors, and outputs the signal in a transport stream. The tuning unit 310 tunes to a broadcast signal in the frequency band corresponding to a control signal of the control unit 390.

The signal processing unit 320 separates the broadcast signal demodulated by the tuning unit 310 into video data, audio data, and additional data defined in Program and Service Information Protocol (PSIP), and outputs data in a bit stream. The video data are decoded, and processed to have output standards of the display unit 340 such as the vertical frequency, the resolution, and the aspect ratio. The audio data are decoded and processed.

The speaker 330 outputs the audio data output from the signal processing unit 320 as sound. The display unit 340 outputs the video data output from the signal processing unit 320 as images.

The storage unit 360 stores diverse programs necessary to perform the operation of the broadcast receiving apparatus, and stores the settings of the broadcast receiving apparatus input by users.

The user interface unit 350 includes keys and a remote control to receive user commands, and receives a key signal corresponding to the user commands and transmits the signal to the control unit 390.

The connection unit 370 may be a connector such as a 9-pin D-SUB, and may be connected to a cable (not shown) to an external device such as a computer.

The data receiving unit 380 receives RS232 data received through the connection unit 370, and converts and outputs the RS232 data into TTL/CMOS data.

That is, unlike the conventional RS232 receiver, voltage level change and logic inversion are performed at the same time, so a high voltage level of +3 V to +15 V is output at a low voltage level of 0 V to +0.8, and a low voltage level of −15 V to −3 V is output at a high voltage level of +2 V to +5 V. The data receiving unit 380 has the same structure as shown in FIGS. 2 and 3, and transmits the output TTL/CMOS data to the control unit 390.

If a user command is input using the user interface unit 350, the control unit 390 operates to carry out a corresponding function. The control unit 390 may be a micom or central processing unit (CPU). The control unit 390 receives the TTL/CMOS data output from the data receiving unit 380, and upgrades programs stored in the storage unit 360 or corrects program errors.

Serial data can be received from an external device such as a computer using the serial data receiving apparatus according to exemplary embodiments of the present invention, instead of an RS232 receiver.

As described above, a serial data receiving apparatus is described as an example of an apparatus which converts input data following RS232 standards into data following TTS/CMOS standards, but the serial data receiving apparatus can also output data of second interface standards other than TTS/CMOS by performing level change and inversion of input data of first standards except for RS232 standards.

As can be appreciated from the above description, serial data are received using a transistor and a resistor, and RS232 data are received using a single diode for protection without using an RS232 receiver, so manufacture costs are reduced.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A serial data receiving apparatus comprising:
    a voltage supply unit which supplies voltage; and
    a conversion unit which converts input data of a first interface standard into data of a second interface standard by changing the voltage level of the input data of the first interface standard and inverting the input data using the voltage supplied from the voltage supply unit,
    wherein the conversion unit comprises a transistor which operates if the input data have a low level, and does not operate if the input data have a high level;
    a first resistor connected between a base of the transistor and an input terminal where the data are input; and
    a second resistor connected between an emitter of the transistor and a ground,
    wherein the input data are output through a node connected to the emitter and the second resistor.

2. The serial data receiving apparatus of claim 1, further comprising a diode having an anode terminal connected to the base of the transistor, and a cathode terminal connected to the ground.

3. An electronic apparatus comprising:
    a connection unit connected to an external device;
    a data receiving unit which performs voltage level change and logic inversion of input data of a first interface standard, which are transmitted from the external device, and outputs data of a second interface standard;
    a storage unit which stores programs for operating the electronic apparatus; and a control unit which receives the data of the second interface standard from the data receiving unit and provides the data to the storage units wherein the data receiving unit comprises a conversion unit which converts input data of a first interface standard into data of a second interface standard by changing the voltage level of the input data of the first interface standard and inverting the input data using a voltage supplied from a voltage supply unit, and wherein the conversion unit comprises:
- at least one first transistor which operates if the input data have a low level, and does not operate if the input data have a high level;
- a first resistor connected between a base of the transistor and an input terminal where the data are input; and
- a second resistor connected between an emitter of the transistor and a ground,
- wherein the input data are output through a node connected to the emitter and the second resistor.

4. The electronic apparatus of claim 3, wherein the input data of the first interface standard are data of Recommended Standard number 232 interface standard, and the data of the second interface standard are data having voltage levels compatible with Transistor-Transistor Logic/Complementary Metal-Oxide Semiconductor (TTL/CMOS) voltage level.

5. The electronic apparatus of claim 3, further comprising a tuner unit which receives and tunes a broadcast signal from a broadcasting station.

6. The electronic apparatus of claim 5, further comprising a display unit which outputs the broadcast signal received at the tuner as images.

7. The electronic apparatus of claim 3, wherein the at least one first transistor is at least one of a PNP Bipolar Junction Transistor (BJT), a P-channel Metal-Oxide Semiconductor Field Effect Transistor (MOSFET), and a P-channel Junction Field Effect Transistor (JFET).

8. The electronic apparatus of claim 3, further comprising a protection unit which protects the conversion unit from external electrical disturbances.

9. The electronic apparatus of claim 3, wherein the conversion unit further comprises:
- at least one second transistor which operates if the input data have a high level, and does not operate if the input data have a low level;
- a first resistor connected between a base of the transistor and an input terminal where the data are input; and
- a second resistor connected between a collector of the transistor and the voltage supply unit,
- wherein the input data are output through a node connected to the collector and the second resistor.

10. The electronic apparatus of claim 9, further comprising a diode having a cathode terminal connected to the base of the transistor and an anode terminal connected to a ground.

11. The electronic apparatus of claim 3, further comprising a diode having an anode terminal connected to the base of the transistor, and a cathode terminal connected to the ground.

12. The electronic apparatus of claim 3, wherein the control unit provides the data to the storage unit to update one or more of the stored programs.

13. The electronic apparatus of claim 9, wherein the at least one second transistor is at least one of an NPN Bipolar Junction Transistor (BJT), an N-channel Metal-Oxide Semiconductor Field Effect Transistor (MOSFET), and an N-channel Junction Field Effect Transistor (JFET).

* * * * *